US012726106B2

(12) United States Patent
Kolhatkar et al.

(10) Patent No.: US 12,726,106 B2
(45) Date of Patent: Sep. 1, 2026

(54) METHOD FOR OPERATING AN ELECTRIC DRIVE APPARATUS, DEVICE FOR OPERATING AN ELECTRIC MACHINE, AND ELECTRIC DRIVE APPARATUS

(71) Applicant: Robert Bosch GmbH, Stuttgart (DE)

(72) Inventors: Yashomani Yashodhan Kolhatkar, Bangalore (IN); Peter Sinn, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 18/572,760

(22) PCT Filed: May 5, 2022

(86) PCT No.: PCT/EP2022/062116
§ 371 (c)(1),
(2) Date: Dec. 20, 2023

(87) PCT Pub. No.: WO2022/268393
PCT Pub. Date: Dec. 29, 2022

(65) Prior Publication Data

US 2024/0291379 A1 Aug. 29, 2024

(30) Foreign Application Priority Data

Jun. 23, 2021 (DE) ..................... 10 2021 206 453.1

(51) Int. Cl.
*H02M 1/32* (2007.01)
*H02M 1/088* (2006.01)
*H02M 7/5387* (2007.01)

(52) U.S. Cl.
CPC ............ *H02M 1/32* (2013.01); *H02M 1/088* (2013.01); *H02M 7/53871* (2013.01)

(58) Field of Classification Search
CPC .... H02M 1/32; H02M 1/088; H02M 7/53871; H02M 1/08; H03K 2217/0072; H03K 17/0828
See application file for complete search history.

(56) References Cited

U.S. PATENT DOCUMENTS

2010/0102638 A1* 4/2010 Chen ........................ B60L 3/04 307/100
2011/0133546 A1 6/2011 Jang et al.
(Continued)

OTHER PUBLICATIONS

Translation of International Search Report for Application No. PCT/EP2022/062116 dated Sep. 5, 2022 (2 pages).
(Continued)

*Primary Examiner* — Thienvu V Tran
*Assistant Examiner* — Lauren Ashley Shaw
(74) *Attorney, Agent, or Firm* — Michael Best & Friedrich LLP

(57) ABSTRACT

A method for operating an electric drive apparatus (1), wherein: the drive apparatus (1) comprises a electric machine (2) and power electronics (7) comprising a DC link capacitor (8) and a half bridge (10), which has a first semiconductor switch (13B) and a second semiconductor switch (12B); the first semiconductor switch (13B) is assigned a DESAT protection circuit (15), a DESAT terminal (21) of the DESAT protection circuit (15) being electrically connected to an anode (19) of the first semiconductor switch (13B); when a discharging specification is present, a discharging mode for discharging the DC link capacitor (8) is set. In the discharging mode, the first semiconductor switch (13B) is switched and the second semiconductor switch (12B) is alternately switched. In the discharging mode, the DESAT terminal (21) is electrically connected to a cathode (16) of the first semiconductor switch (13B) to inhibit triggering of the DESAT protection circuit (15).

13 Claims, 3 Drawing Sheets

(56) References Cited

U.S. PATENT DOCUMENTS

2014/0203843 A1* 7/2014 Cottell .................. H03K 17/78 327/81
2015/0326009 A1* 11/2015 Mari Curbelo ...... H03K 17/168 363/50
2016/0181919 A1* 6/2016 Pavlovsky ............. H02M 1/32 323/235
2018/0198442 A1* 7/2018 Hokazono ............. H03K 17/30
2020/0228109 A1 7/2020 Bachhuber

OTHER PUBLICATIONS

Huang et al., "Noise Immunity of Desat Protection Circuitry for High Voltage SiC MOSFETs with High dv/dt," IEEE Applied Power Electronics Conference and Exposition (APEC), 2021, 8 pages.

* cited by examiner

CONTROL APPARATUS
ENERGY STORAGE
12C
12B
12A
13C
13B
13A
U
V
W
50
14
6
8
9
10
11
7
1
2
3
4
5

METHOD FOR OPERATING AN ELECTRIC DRIVE APPARATUS, DEVICE FOR OPERATING AN ELECTRIC MACHINE, AND ELECTRIC DRIVE APPARATUS

BACKGROUND

The invention relates to a method for operating an electric drive apparatus, whereby the drive apparatus comprises at least one electric machine and power electronics assigned to the machine, the power electronics comprising a DC link capacitor and at least one half bridge, which has at least a first semiconductor switch and a second semiconductor switch; at least the first semiconductor switch is assigned a DESAT protection circuit, a DESAT terminal of the DESAT protection circuit being electrically connected to an anode of the first semiconductor switch, when a discharging specification is present, a discharging mode for discharging the DC link capacitor is set; and, in the discharging mode, the first semiconductor switch is conductingly switched and the second semiconductor switch is alternately conductingly switched and nonconductingly switched.

The invention additionally relates to a device for operating an electrical machine.

The invention further relates to an electric drive apparatus.

Methods and electric drive apparatuses of the type specified hereinabove are known from the prior art. An electric drive apparatus typically comprises at least one electric machine and power electronics assigned to the machine. The power electronics generally comprise a DC link capacitor and at least one half bridge with at least a first semiconductor switch and a second semiconductor switch. It is known from the prior art that, when a discharging specification is present, a discharging mode for discharging the DC link capacitor is set. And, in the discharging mode, the first semiconductor switch is conductingly switched and the second semiconductor switch is alternately conductingly switched and nonconductingly switched. In the discharging mode, time intervals in which only the first semiconductor switch is conductive then alternate with time intervals in which both the first and the second semiconductor switch are conductive. As a result, in the discharging mode, a rapid discharge of the DC link capacitor is achieved.

It is also known from the prior art to monitor semiconductor switches having what are referred to as DESAT protection circuits. A DESAT protection circuit is a protection circuit designed to interpret a voltage increase over an anode cathode path of a semiconductor switch as an overcurrent or short circuit current.

For this purpose, a DESAT terminal of the DESAT protection circuit is typically electrically connected to the anode of the semiconductor switch. The DESAT protection circuit is typically activated when the semiconductor switch is conductingly switched. The activated DESAT protection circuit then monitors an electrical voltage between an electrical potential of the DESAT terminal on the one hand and an electrical reference potential on the other hand. If this electrical voltage exceeds a predetermined threshold value, the DESAT protection circuit is triggered. The triggered DESAT protection circuit then performs a safety measure, whereby the semiconductor switch is typically nonconductingly switched as part of the safety measure.

SUMMARY

The method according to the invention has the advantage that, in the discharging mode, an undesirable termination of the discharge of the DC link capacitor is prevented. According to the invention, in the discharging mode, the DESAT terminal is electrically connected to a cathode of the first semiconductor switch in order to inhibit triggering of the DESAT protection circuit. In the discharging mode, high electrical load currents flow through a load path of the first semiconductor switch to discharge the DC link capacitor. This can generally lead to a triggering of the DESAT protection circuit assigned to the first semiconductor switch. As indicated hereinabove, triggering a DESAT protection circuit results in non-conductive switching of the semiconductor switch. In the case of the first semiconductor switch, this would mean that discharging of the DC link capacitor is interrupted by the triggering of the DESAT protection circuit. This interruption is undesirable in the discharging mode. According to the invention, triggering the DESAT protection circuit is inhibited by electrically connecting the DESAT terminal to the cathode. By connecting the DESAT terminal to the cathode, it is prevented that the electrical voltage between the potential of the DESAT terminal and the reference potential exceeds the threshold value. The electrical connection between the DESAT terminal and the cathode means a connection by bypassing the semiconductor element of the first semiconductor switch. Preferably, the first and second semiconductor switches are each designed as IGBT, MOSFET, SiC semiconductor switches, GaN semiconductor switches, or bipolar semiconductor switches. Preferably, the first semiconductor switch is a low-side switch of the half bridge. The second semiconductor switch is then a high-side switch of the half bridge. Alternatively, the first semiconductor switch is preferably a high-side switch of the half bridge, whereby the second semiconductor switch is then a low-side switch of the half bridge. Preferably, in addition to the half bridge with the first and second semiconductor switches, the power electronics comprise at least one further half bridge with two semiconductor switches. Preferably, the semiconductor switches of the further half bridge or the further half bridges are nonconductingly switched in the discharging mode, such that the DC link capacitor is discharged in the discharging mode only by the half bridge with the first and second semiconductor switches. Alternatively, the semiconductor switches of at least one further half bridge are switched analogously to the first and the second semiconductor switches in the discharging mode. The DC link capacitor is then discharged in the discharging mode by the half bridge and the at least one further half bridge. Preferably, the DESAT terminal is electrically connected to the cathode immediately upon setting the discharging mode.

According to one preferred embodiment, it is provided that the drive apparatus is monitored for malfunctions, and that the discharging specification is provided when a malfunction is detected. In the event of a malfunction of the drive apparatus, a rapid discharge of the DC link capacitor is usually desirable. Preferably, the electric machine and/or the power electronics are monitored for malfunctions.

According to a preferred embodiment, it is provided that the DESAT protection circuit comprises an electrical line with a switching element, whereby the line is electrically connected to the DESAT terminal on one side and the cathode on the other side, and whereby the DESAT terminal is electrically connected to the cathode in the discharging mode by conductingly switching the switching element. Thus, in addition to the first and the second semiconductor switches, a switching element is provided and the DESAT terminal is electrically connected to the cathode by conductingly switching the switching element. Preferably, the switching element is designed as a MOSFET.

Preferably, the switching element is conductingly switched only in the discharging mode. Outside of the discharging mode, the switching element is non-conductive or inactive, so that no function is possible for the switching element outside of the discharging mode.

According to one preferred embodiment, it is provided that the second semiconductor switch is assigned to a further DESAT protection circuit and that in the discharging mode only triggering of the DESAT protection circuit assigned to the first semiconductor switch is inhibited. The first and second semiconductor switches are thus each assigned to a different DESAT protection circuit. With respect to the further DESAT protection circuit assigned to the second semiconductor switch, no undesirable triggering is typically expected in the discharging mode. An inhibition of the further DESAT protection circuit is therefore not necessary in the discharging mode. It is instead desired that the further DESAT protection circuit also monitors the second semiconductor switch in the discharging mode.

The device according to the invention for operating an electric machine comprises power electronics, having a DC link capacitor and at least one half bridge having at least a first semiconductor switch and a second semiconductor switch, and a control apparatus, which is designed, when a discharging specification is present, to set a discharging mode for discharging the DC link capacitor, whereby in the discharging mode, the control apparatus conductingly switches the first semiconductor switch and the second semiconductor switch is alternately conductingly switched and nonconductingly switched, whereby at least the first semiconductor switch is assigned to a DESAT protection circuit, and whereby a DESAT terminal of the DESAT protection circuit is electrically connected to an anode of the first semiconductor switch. The device is characterized according to the invention in that the control apparatus is designed to electrically connect the DESAT terminal to a cathode of the first semiconductor switch in the discharging mode in order to inhibit triggering of the DESAT protection circuit. The advantages specified hereinabove also result thereby. Further preferred features and feature combinations result from the description as well as the claims. Preferably, the first and second semiconductor switches are each designed as IGBT, MOSFET, SiC semiconductor switches, GaN semiconductor switches, or bipolar semiconductor switches. Preferably, the control apparatus is designed to monitor the machine and/or the power electronics for malfunction and to provide the discharging specification upon detection of a malfunction.

According to a preferred embodiment, it is provided that the DESAT protection circuit comprises a line with a switching element, whereby the line is electrically connected to the DESAT terminal on one side and the cathode on the other side, and whereby the control apparatus is designed to electrically connect the DESAT terminal to the cathode mode by conductingly switching the switching element.

Thus, in addition to the first and the second semiconductor switches, a switching element is provided and the DESAT terminal is electrically connected to the cathode by conductingly switching the switching element. The switching element is preferably designed as a field effect transistor, more preferably as a MOSFET.

According to a preferred embodiment, it is provided that the DESAT terminal is electrically connected to the anode of the first semiconductor switch by a DESAT line, whereby the DESAT line comprises a diode conducting towards the anode, and whereby the line between the DESAT terminal and the diode is electrically connected to the DESAT line. Generally, the line enables an electrical current to flow from the DESAT terminal to the cathode bypassing the semiconductor element of the first semiconductor switch.

However, because the line between the DESAT terminal and the diode is electrically connected to the DESAT line, an electrical current from the anode is prevented from flowing to the cathode bypassing the semiconductor element of the first semiconductor switch.

According to one preferred embodiment, it is provided that the device comprises a test unit, which is designed to check whether the switching element has a malfunction, depending on a control signal for the switching element on the one hand and a determined actual state of the switching element on the other hand. The operational safety of the device can be increased by the test unit or the test performed by the test unit. Given its actual state, the switching element can be either conductive or non-conductive. The control signal for the switching element corresponds to a target state of the switching element. The test unit preferably determines that the switching element is malfunctioning when the switching element is actuated but is non-conductive, or when the switching element is not actuated but is conductive. Accordingly, the test unit preferably determines that the switching element has no malfunction when the switching element is actuated and is conductive, or when the switching element is not actuated and is non-conductive. If the test unit determines that the switching element has a malfunction, then the test unit preferably initiates an appropriate safety measure.

According to one preferred embodiment, it is provided that the line comprises an electrically resistive element connected in series with the switching element and that the test unit is designed to monitor an electrical potential of the line between the switching element and the resistive element and to determine the actual state of the switching element as a function of the potential of the line. Based on the potential of the line, the current actual state of the switching element can be reliably determined, i.e., whether the switching element is conductive or non-conductive. The line preferably comprises the resistive element between the switching element and the cathode. Alternatively, the line preferably comprises the resistive element between the switching element and the DESAT terminal.

The test unit preferably comprises an exclusive OR gate. Given the relationship explained hereinabove between the control signal and the potential of the line, an exclusive OR gate is particularly suitable for determining or testing whether or not the switching element has a malfunction.

Preferably, the first semiconductor switch is a low-side switch of the half bridge. The second semiconductor switch is then correspondingly a high-side switch of the half bridge. Preferably, the first semiconductor switch is a high-side switch of the half bridge. The second semiconductor switch is then correspondingly a low-side switch of the half bridge.

The electric drive apparatus according to the invention comprises at least one electric machine and is characterized according to the invention by means of the device according to the invention for operating the machine. The advantages specified hereinabove also result thereby. Further preferred features and feature combinations result from the description as well as the claims.

BRIEF DESCRIPTION OF THE DRAWINGS

The invention is explained in greater detail hereinafter with reference to the drawings. Shown are.

DETAILED DESCRIPTION

Figure 1:
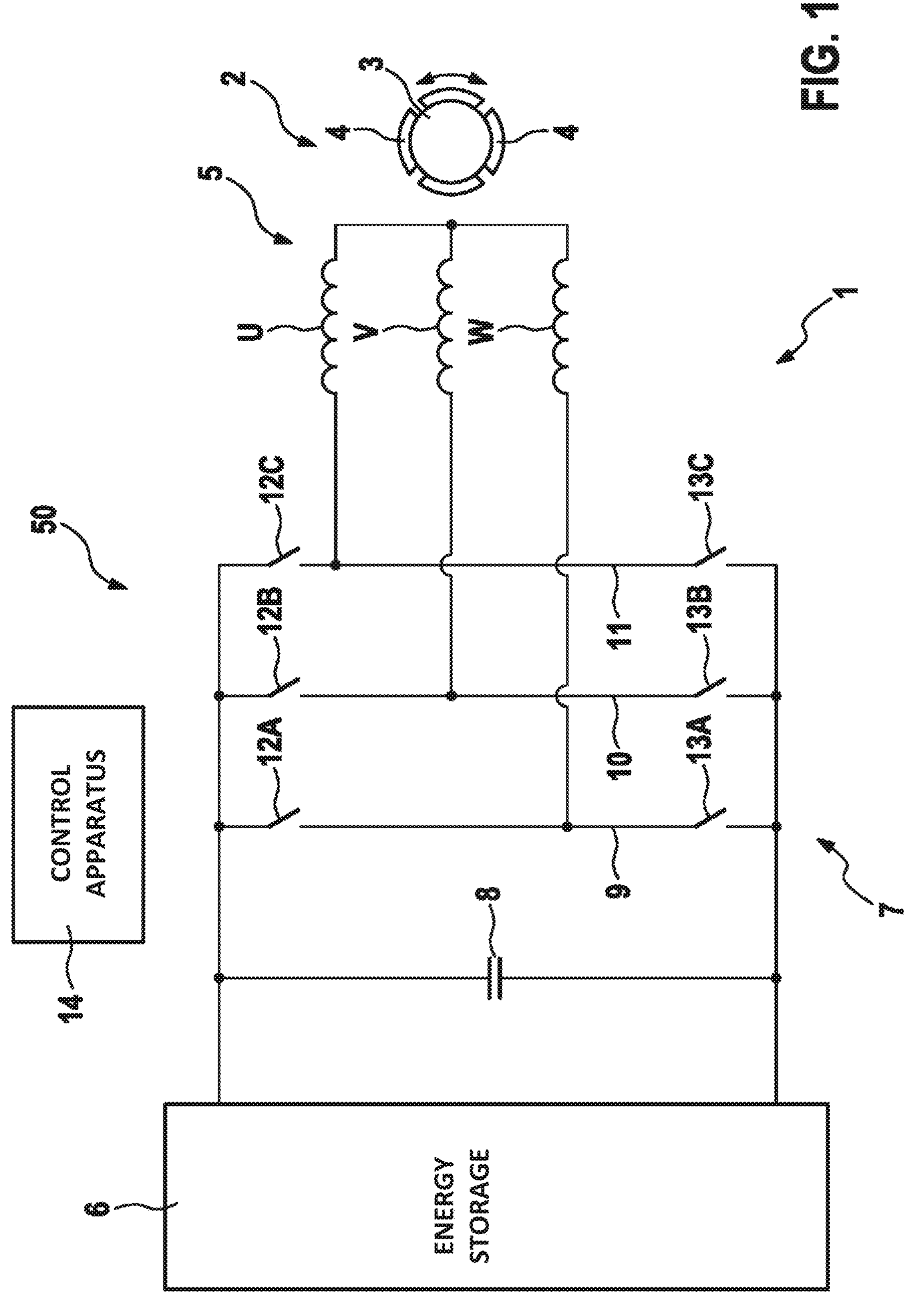
FIG. 1 an electric drive apparatus.

FIG. 1 shows an electric drive apparatus 1 in a schematic diagram. For example, the drive apparatus 1 is the drive apparatus 1 of a motor vehicle. The drive system 1 comprises an electric machine 2. The electric machine 2 comprises a rotatably mounted rotor 3, on which a plurality of permanent magnets 4 are arranged in a rotationally fixed manner. The machine 2 also comprises a motor winding 5 with three phases, in the present case U, V, and W. The motor winding 5 is arranged around the rotor 3 such that the rotor 3 is rotatable by a suitable energization of the phases U, V, and W. Given the embodiment described hereinabove, the machine 2 is in the present case designed as a permanent magnet-energized synchronous machine 2. However, other embodiments of the machine 2 are also possible. For example, the machine 2 is designed as an asynchronous machine according to a further exemplary embodiment.

The drive apparatus 1 also comprises an electrical energy storage means 6. The motor winding 5 is electrically connected to the energy storage means 6 by power electronics 7 of the drive apparatus 1.

The power electronics 7 comprise a DC link capacitor 8. In addition, the power electronics 7 comprise a number of half bridges 9, 10, and 11 corresponding to the number of phases U, V, and W. Each of the half bridges 9, 10, and 11 comprises two respective semiconductor switches 12 and 13. The semiconductor switches 12 are high-side switches 12 of the half bridges 9, 10, and 11. Semiconductor switches 13 are low-side switches 13 of half bridges 9, 10, and 11.

The drive apparatus 1 also comprises a control apparatus 14 for controlling the power electronics 7, whereby the control apparatus 14 is shown merely simplified in FIG. 1. In the present case, the control apparatus 14 comprises a computational unit in the form of a microcontroller. The control apparatus 14 further comprises a number of gate driver circuits corresponding to the number of semiconductor switches 12 and 13, whereby each of the semiconductor switches 12 and 13 is assigned to a different one of the gate driver circuits. The power electronics 7 and the control apparatus 14 together form a device 50 for operating the electric machine 2.

Figure 2:
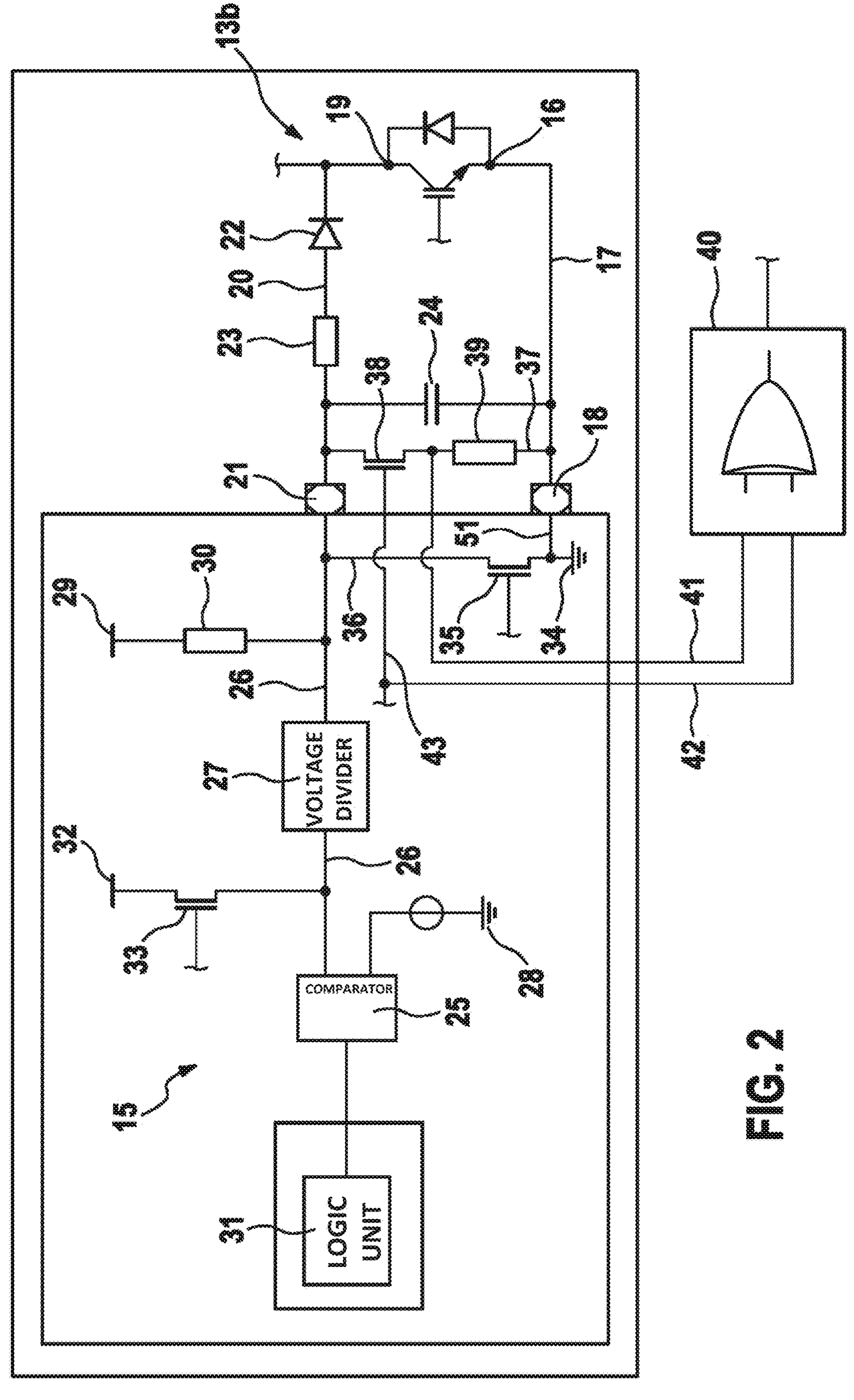
FIG. 2 a semiconductor switch of power electronics of the drive apparatus as well as a DESAT protection circuit assigned to the semiconductor switch, and FIG. 3 a method for operating the drive apparatus.

FIG. 2 shows the low-side switch 13B of the middle half bridge 10. In the present case, the low-side switch 13B is, e.g., an IGBT. The low-side switch 13B is assigned to a DESAT protection circuit 15 for monitoring the low-side switch 13B. The DESAT protection circuit 15 is part of the gate driver circuit assigned to the low-side switch 13B. The specific configuration of the DESAT protection circuit 15 shown in FIG. 2 should be understood by way of example. As an alternative to the DESAT protection circuit 15 shown in FIG. 2, a different type of DESAT protection circuit can also be provided.

The low-side switch 13B comprises a cathode 16. The cathode 16 is electrically connected to a ground terminal 18 by a conductor 17.

The low-side switch 13B also comprises an anode 19. The anode 19 is electrically connected to a DESAT terminal 21 of the DESAT protection circuit 15 by a DESAT line 20. The DESAT line 20 comprises a diode 22 which is conductive towards the anode 19. Between the DESAT terminal 21 and the diode 22, the DESAT line 20 comprises an electrically resistive element 23. The DESAT line 20 is capacitively coupled to the conductor 17 by a capacitor element 24.

The DESAT protection circuit 15 comprises a comparator 25. The comparator 25 is electrically connected on the input side by a conductor 26 and a voltage divider 27 to the DESAT terminal 21. In addition, the comparator 25 is connected on the input side to an electrical reference potential 28, whereby the reference potential 28 is in the present case a ground node 28 of the DESAT protection circuit 15. The DESAT protection circuit 15 also comprises a first power source 29 electrically connected to the conductor 26 by an electrical resistance 30 between the voltage divider 27 and the DESAT terminal 21.

The DESAT protection circuit 15 is activated when the low-side switch 13B is conductingly switched. If the DESAT protection circuit 15 is activated, the first power source 29 provides an electrical test current flowing through the DESAT line 20. The comparator 25 then compares the electrical potential of the DESAT terminal 21 with the electrical reference potential 28. The electrical potential of the DESAT terminal 21 corresponds to the amount of an electrical load current flowing from the anode 19 to the cathode 16 such that the potential of the DESAT terminal 21 increases with the load current. If an electrical voltage between the potential of the DESAT terminal 21 and the reference potential 28 exceeds a predetermined threshold value, then it must be assumed that the load current is undesirably high. The DESAT protection circuit is then triggered and the comparator 25 provides information to a logic unit 31 of the DESAT protection circuit 15 regarding the electrical voltage exceeding the threshold value. The logic unit 31 then initiates a safety measure whereby, as part of the safety measure, the low-side switch 13B is nonconductingly switched.

The DESAT protection circuit 15 also comprises a second power source 32 electrically connected to the conductor 26 by a semiconductor switch 33 between the voltage divider 27 and the comparator 25. In the present case, the semiconductor switch 33 is a MOSFET 33. An electrical test voltage can be applied to the comparator 25 by the second current source 32 to test whether the comparator 25 is malfunctioning.

DESAT protection circuit 15 further comprises a ground node 34 electrically connected to the conductor 26 by a conductor 36 between the voltage divider 27 and the DESAT terminal 21. The conductor 36 comprises a semiconductor switch 35. In the present case, the semiconductor switch 35 is a MOSFET 35. The ground terminal 18 is electrically connected to the conductor 36 by a conductor 51 between the semiconductor switch 35 and the ground node 34. The semiconductor switch 35 is conductingly switched when the DESAT protection circuit 15 is inactive. If the semiconductor switch 35 is conductive, then the capacitor 24 is discharged.

The DESAT protection circuit 15 also comprises a line 37. The line is electrically connected between the DESAT terminal 21 and the resistive element 23 to the DESAT line 20. The line 37 is thus electrically connected to the DESAT terminal 21. In addition, the line 37 is electrically connected to the conductor 17. The line 37 is thus electrically connected to the cathode 16 of the low-side switch 13B. The line 37 comprises a switching element 38. In the present case, the switching element 38 is a MOSFET 38. Between the switching element 38 and the conductor 17, the line 37 comprises an electrically resistive element 39.

Preferably, the semiconductor switches 12A, 12B, 12C, 13A, and 13C are also each assigned to a different DESAT protection circuit, whereby these DESAT protection circuits substantially correspond to DESAT protection circuit 15 with respect to their design features.

The control apparatus 14 also comprises a test unit 40. The test unit 40 is electrically connected to the line 37 by a conductor 41 between the switching element 38 and the resistive element 39. The test unit 40 is also electrically connected to a control line 43 by a conductor 42. The control line 43 applies a control signal to the switching element 38. In this respect, the conductor 41 provides the test unit 40 with information regarding the actual state of the switching element 38, i.e., the electrical potential of the line between the switching element 38 and the resistive element 39. On the other hand, the test unit is provided with information regarding the target state of the switching element 38 by the conductor 42, namely the control signal for the switching element 38.

Figure 3:
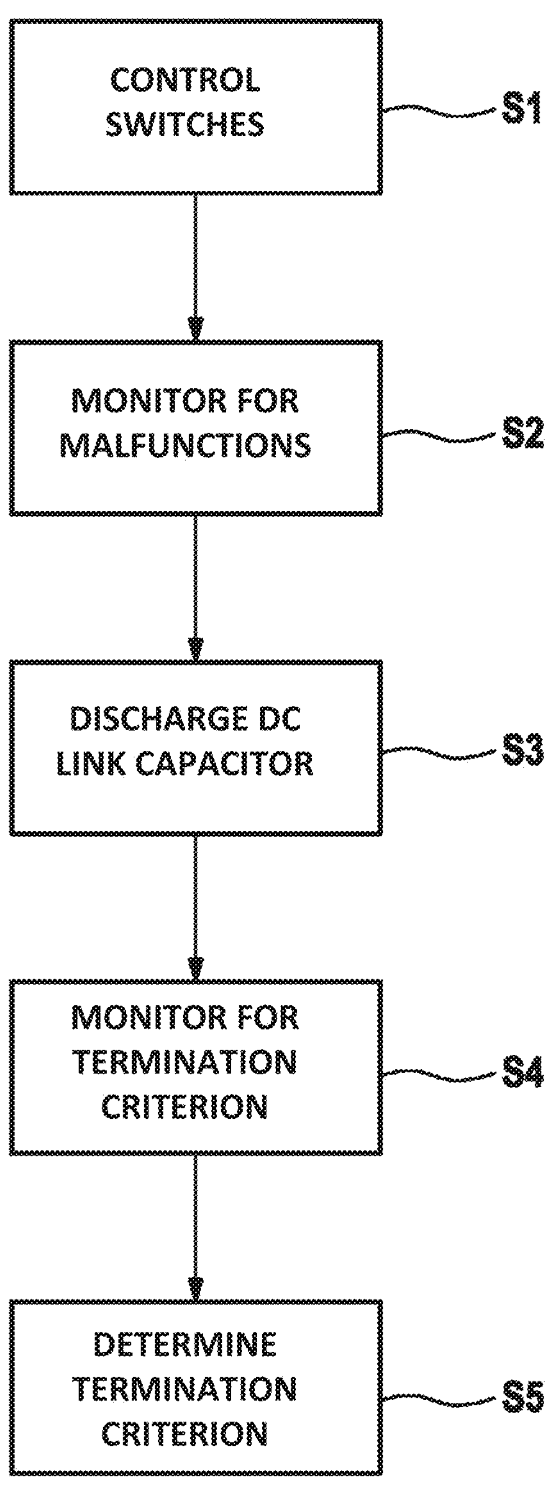

An advantageous method for operating the drive apparatus 1 will be explained in greater detail hereinafter with reference to FIG. 3.

In a first step S1, the high-side switches 12 and the low-side switches 13 are controlled by the control apparatus 14 such that the motor winding 5 generates a drive magnetic field driving the rotor 3.

In a second step S2, the control apparatus 14 monitors the machine 2 and the power electronics 7 for malfunctions. If the control apparatus 14 detects a malfunction, then the control apparatus 14 provides a discharging specification. According to a further embodiment of the method, the control apparatus 14 provides the discharging specification for a trigger other than detecting a malfunction.

If the discharging specification is present, then reference is made to a third step S3. In the third step S3, the control apparatus 14 then sets a discharging mode to discharge the DC link capacitor 8. In order to achieve a rapid discharge of the DC link capacitor 8, the control apparatus 14 conductingly switches the low-side switch 13B. In addition, the control apparatus 14 alternately conductingly switches and nonconductingly switches the high-side switch 12B. In the discharging mode, time intervals in which only the low-side switch 13B is conductive then alternate with time intervals during which both the low-side switch 13B and the high-side switch 12B are conductive. The DC link capacitor 8 is as a result discharged through the half bridge 10. The remaining high-side switches 12A and 12C as well as the remaining low-side switches 13A and 13C nonconductingly switch the control apparatus 14 according to the exemplary embodiment shown in FIG. 3 in the discharging mode. In the present case, the DC link capacitor 8 is thus discharged only by the middle half bridge 10.

Given that the first semiconductor switch 13B is conductingly switched in the discharging mode, the DESAT protection circuit 15 assigned to the low-side switch 13B is also activated in the discharging mode. In this case, the electrical load current flowing through the low-side switch 13B in the discharging mode can generally lead to the electrical potential of the DESAT terminal 21 increasing so far that the DESAT protection circuit 15 is triggered. This is undesirable in the discharging mode. In order to prevent triggering the DESAT protection circuit 15 in the discharging mode, the control apparatus 14 also conductingly switches the switching element 38 in the discharging mode or in step S3. The DESAT terminal 21 of the DESAT protection circuit 15 is thereby connected to the cathode 16 of the low-side switch 13B, and thus to the ground terminal 18. The electrical connection of the DESAT terminal 21 to the cathode 16 prevents the electrical voltage between the potential of the DESAT terminal 21 and the reference potential 28 from exceeding the threshold value. Triggering of the DESAT protection circuit 15 is thus inhibited.

In a fourth step S4, the control apparatus 14 monitors whether a predetermined termination criterion is satisfied. For example, control apparatus 14 determines that the termination criterion is satisfied when a predetermined amount of time has elapsed that starts with setting the discharging mode. Alternatively, the control apparatus 14 determines, e.g., that the termination criterion is satisfied when the electrical load current flowing through the first semiconductor switch 13B is below a predetermined threshold. Alternatively, the control apparatus 14 determines, e.g., that the termination criterion is satisfied if an electrical DC link voltage of the DC link capacitor 8 falls below a predetermined threshold.

If during step S4 the control apparatus 14 determines that the termination criterion is satisfied, then reference is made to a fifth step S5. In step S5, the control apparatus 14 then ends the discharging mode.

The test unit 40 checks for a malfunction of the switching element 38 both during the discharging mode and outside the discharging mode. In this case, the test unit 40 determines that the switching element 38 has a malfunction when the control line 43 applies a control signal to the switching element 38 but is non-conductive, or when the control signal is not applied to the switching element 38 but is conductive. Accordingly, the test unit 40 determines that the switching element 38 does not have a malfunction when the control line 43 applies a control signal to the switching element 38 and is conductive, or when the a control signal is not applied to the switching element 38 and is non-conductive. If the test unit 40 determines that the switching element 38 has a malfunction, the test unit 40 provides information to the microcontroller of the control apparatus 14 regarding the detected malfunction. The microcontroller then controls semiconductor switches 12 and 13 such that the power electronics 7 and the machine 2 are transitioned to a safe operating state.

According to one further embodiment of the method, in the discharging mode, the high-side-switch 12B is conductingly switched and the low-side switch 13B is alternately conductingly switched and nonconductingly switched. In this embodiment of the method, in the discharging mode, a triggering of the DESAT protection circuit assigned to the high-side switch 12B is then inhibited.

According to a further exemplary embodiment, in the discharging mode, the DC link capacitor 8 is discharged not by the half bridge 10 but by the half bridge 9 or the half bridge 11. In the discharging mode, one semiconductor switch of the half bridge 9 or 11 is then conductingly switched and the other semiconductor switch of the half bridge 9 or 11 is alternately conductingly switched and nonconductingly switched. In addition, the triggering of the DESAT protection circuit assigned to the conductingly switched semiconductor switch is inhibited.

According to a further exemplary embodiment, in the discharging mode, the DC link capacitor 8 is discharged by a plurality of the half bridges 9, 10, and 11. In this case, in the discharging mode, one semiconductor switch of each of the half bridges involved is conductingly switched and the other semiconductor switch of each of the half bridges involved is alternately conductingly switched and nonconductingly switched.

In addition, triggering of the DESAT protection circuits assigned to the conductively switched semiconductor switches is inhibited.

Preferably, only the DESAT protection circuits comprise a line 37 with a switching element 38, the triggering of which is inhibited in the discharging mode. Alternatively, preferably all DESAT protection circuits comprise a line 37 with a switching element 38.

The invention claimed is:

1. A method for operating drive apparatus, wherein the drive apparatus (1) comprises at least one electric machine (2) and power electronics (7) assigned to the machine (2), wherein the power electronics (7) comprise a DC link capacitor (8) and at least one half bridge (10), which has at least a first semiconductor switch (13B) and a second semiconductor switch (12B), wherein at least the first semiconductor switch (13B) is assigned a DESAT protection circuit (15), wherein a DESAT terminal (21) of the DESAT protection circuit (15) is electrically connected to an anode (19) of the first semiconductor switch (13B), wherein, when a discharging specification is present, a discharging mode for discharging the DC link capacitor (8) is set, and wherein, in the discharging mode, the first semiconductor switch (13B) is conductingly switched and the second semiconductor switch (12B) is alternately conductingly switched and nonconductingly switched, wherein in the discharging mode, the DESAT terminal (21) is electrically connected to a cathode (16) of the first semiconductor switch (13B) in order to inhibit triggering of the DESAT protection circuit (15).

2. The method according to claim 1, wherein the drive apparatus (1) is monitored for malfunctions, and that the discharging specification is provided when a malfunction is detected.

3. The method according to claim 1, wherein the power electronics (7) comprises an electrical line (37) having a switching element (38), wherein the line (37) is electrically connected to the DESAT terminal (21) and the cathode (16), and wherein the DESAT terminal (21) is electrically connected to the cathode (16) in the discharging mode by conductingly switching the switching element (38).

4. The method according to claim 3, wherein the switching element (38) is conductingly switched only in the discharging mode.

5. The method according to claim 1, wherein the second semiconductor switch (12B) is assigned to a further DESAT protection circuit and that, in the discharging mode, only the triggering of the DESAT protection circuit (15) assigned to the first semiconductor switch (13B) is inhibited.

6. A device for operating an electric machine having a power electronics (7), which comprises a DC link capacitor (8) and at least one half bridge (10) having at least a first semiconductor switch (13B) and a second semiconductor switch (12B), and having a control apparatus (14) which is, when a discharging specification is present, designed to set a discharging mode for discharging the DC link capacitor (8), wherein, in the discharging mode, the control apparatus (14) conductingly switches the first semiconductor switch (13B) and alternately conductingly switches and nonconductingly switches the second semiconductor switch (12B), wherein at least the first semiconductor switch (13B) is assigned to a DESAT protection circuit (15), and wherein a DESAT terminal (21) of the DESAT protection circuit (15) is electrically connected to an anode (19) of the first semiconductor switch (13B), wherein that the control apparatus (14) is designed to electrically connect the DESAT terminal (21) to a cathode (16) of the first semiconductor switch (13B) in the discharging mode in order to inhibit triggering of the DESAT protection circuit (15).

7. The device according to claim 6, wherein the power electronics (7) comprises a line (37) having a switching element (38), wherein the line (37) is electrically connected to the DESAT terminal (21) and the cathode (16), and wherein a control apparatus (14) is designed to electrically connect the DESAT terminal (21) to the cathode (16) by conductingly switching the switching element (38).

8. The device according to claim 6, wherein the DESAT terminal (21) is electrically connected to the anode (19) of the first semiconductor switch (13B) by a DESAT line (20), wherein the DESAT line (20) comprises a diode (22) that is conductive towards the anode (19), and wherein the line (37) between the DESAT terminal (21) and the diode (22) is electrically connected to the DESAT line (20).

9. The device according to claim 7, wherein a test unit (40), which is designed to check whether the switching element (38), has a malfunction as a function of a control signal for the switching element (38) and a determined actual state of the switching element (38).

10. The device according to claim 9, wherein the line (37) comprises an electrically resistive element (39) connected in series with the switching element (38), and in that the test unit (40) is designed to monitor an electrical potential of the line (37) between the switching element (38) and the resistive element (39) and to determine the actual state of the switching element (38) as a function of the potential of the line (37).

11. The device according to claim 9, wherein the test unit (40) comprises an exclusive OR gate.

12. The device according to claim 6, wherein the first semiconductor switch (13B) is a low-side switch (13B) of the half bridge (10), or in that the first semiconductor switch (12B) is a high-side switch (12B) of the half bridge (10).

13. An electrical drive apparatus comprising at least one electric machine (2) and thea device according to claim 6 for operating the electric machine (2).

* * * * *